(12) United States Patent
King et al.

(10) Patent No.: US 6,507,128 B2
(45) Date of Patent: Jan. 14, 2003

(54) LOW-ENERGY STORAGE FAST-START UNINTERRUPTIBLE POWER SUPPLY SYSTEM AND METHOD

(75) Inventors: Robert Dean King, Schenectady, NY (US); Gautam Sinha, Clifton Park, NY (US)

(73) Assignee: General Electric Company, Niskayuna, NY (US)

(*) Notice: Subject to any disclaimer, the term of this patent is extended or adjusted under 35 U.S.C. 154(b) by 7 days.

(21) Appl. No.: 09/681,697

(22) Filed: May 23, 2001

(65) Prior Publication Data

US 2002/0175660 A1 Nov. 28, 2002

(51) Int. Cl.$^7$ .............................. F02N 11/06; H02J 9/08
(52) U.S. Cl. ......................... 290/40 C; 322/4; 290/24; 307/64
(58) Field of Search .................. 290/40 R, 40 A, 290/40 B, 40 C, 11, 24; 322/4, 7; 307/64

(56) References Cited

U.S. PATENT DOCUMENTS

| | | | | |
|---|---|---|---|---|
| 4,439,720 A | * | 3/1984 | Georges | 290/4 R |
| 5,856,709 A | * | 1/1999 | Ibaraki et al. | 180/165 |
| 5,982,045 A | * | 11/1999 | Tabata et al. | 290/17 |
| 6,018,198 A | * | 1/2000 | Tsuzuki et al. | 180/65.2 |
| 6,098,584 A | * | 8/2000 | Ahner et al. | 123/179.3 |
| 6,239,513 B1 | * | 5/2001 | Dean et al. | 307/64 |
| 6,255,743 B1 | * | 7/2001 | Pinkerton et al. | 290/40 A |
| 6,320,279 B1 | * | 11/2001 | Lopez Jimenez | 307/64 |
| 6,365,983 B1 | * | 4/2002 | Masberg et al. | 290/40 C |
| 2002/0101119 A1 | * | 8/2002 | Eisenhaure et al. | 307/64 |

OTHER PUBLICATIONS

US Patent Application, Ser. No. 09/617,954 Filed Sep. 25, 2000 by Sinha, Entitled "A Starting System and Method for a Microturbine Power Generation Unit", Attorney Docket RD–28,038.

US Patent Application, Ser. No. 09/617, 9555 Filed Sep. 25, 2000 by Sinha, et al, Entitled "A Microturbine Based Power Generation System and Method", Attorney Docket RD–27.992.

* cited by examiner

Primary Examiner—Nicholas Ponomarenko

(57) ABSTRACT

An uninterruptible power supply system has standby and backup modes and can change to backup mode upon detection of a grid fault. In both modes an alternator rotates at synchronous-speed so that backup mode capability is ready. An energy storage unit through a DC-AC inverter remains coupled to the grid in standby mode so that it is charged, ready to supply power when changed to backup mode. In standby mode, first and third clutches are disengaged and engaged, transmitting alternator rotary motion to a flywheel but not therefrom to a heat engine. In backup mode, first and third clutch are engaged and disengaged to permit the alternator, via a second clutch, to overrun the flywheel and allow transmitting of flywheel torque to accelerate the heat engine to starting speed for driving the alternator to supply power to the grid after the engine is at operating speed and coupled to the alternator through a locked second clutch and an engaged third clutch.

14 Claims, 3 Drawing Sheets

LOW-ENERGY STORAGE FAST-START UNINTERRUPTIBLE POWER SUPPLY SYSTEM AND METHOD

BACKGROUND OF INVENTION

The present invention generally relates to a backup system for a utility power grid and, more particularly, is concerned with an uninterruptible power supply (UPS) system and method having a fast-start capability and a low-energy storage requirement.

Present day computer data centers and internet service providers require highly reliable sources of uninterruptible power. Dual fed utility grid systems plus uninterruptible power supplies with back-up generation are utilized to meet the stringent demands for critical power. A conventional UPS system normally includes a DC-AC inverter, transfer switches, an energy storage unit, oftentimes using massive lead acid batteries, and, in many cases, an alternator driven by a heat engine. During a fault in the dual-fed grid source, DC power from the energy storage unit (usually batteries) is converted to the proper AC voltage, current, and frequency and connected to the critical loads via the transfer switches. Further, many of the conventional UPS systems, rated to provide critical power for long periods of time, have a heat engine and an alternator in addition to the battery energy storage unit. In these conventional UPS systems, the battery energy storage unit is required to provide the electrical power to the critical load until the heat engine is cranked and started and the alternator has achieved a stabilized output.

A problem exists, however, in that conventional engine driven alternator UPS systems with 100 kW–1 MW power ratings typically require at least 15 seconds to start the heat engine and alternator and stabilize the electrical output prior to connecting the alternator to the critical load via the transfer switches. During the initial 15 seconds, the energy storage unit supplies all of the energy to the critical load via the inverter. Therefore, the energy storage unit is required to supply rated power for at least 15 seconds, meaning that for a 1 MW rated UPS system at least 4.2 kWh of energy storage is required.

Consequently, a need exists for an innovation which will greatly reduce the duration of rated power required to be supplied by the energy storage unit and thus eliminate the need to use massive lead acid batteries in the energy storage unit of the UPS system.

SUMMARY OF INVENTION

The present invention provides an uninterruptible power supply (UPS) system and method designed to satisfy the aforementioned need. The UPS system of the present invention has a fast-start capability that greatly reduces the duration of rated power required to be supplied by an energy storage unit and thus eliminates the need to use massive lead acid batteries in the energy storage unit of the UPS system.

In one embodiment of the present invention, an uninterruptible power supply system having a standby mode of operation and a backup mode of operation is provided which includes a heat engine having a crankshaft, an alternator having an input shaft and an output electrically connected to an electrical power grid, a flywheel disposed between the heat engine crankshaft and alternator input shaft, a first motion transmitting mechanism disposed between the flywheel and heat engine crankshaft and actuatable between engaged and disengaged conditions for correspondingly drivingly coupling and decoupling the flywheel to and from the heat engine crankshaft, a second motion transmitting mechanism providing a one-way drive coupling between the flywheel and alternator input shaft, a third motion transmitting mechanism disposed between the flywheel and alternator input shaft and actuatable between engaged and disengaged conditions for correspondingly drivingly coupling and decoupling the flywheel to and from the alternator input shaft, a source of AC electrical energy connected to the electrical power grid, and an uninterruptible power supply system control connected to the electrical power grid and to the heat engine and first and third motion transmitting mechanisms for controlling operation of the heat engine and first and third motion transmitting mechanism so as to change the system from a standby mode of operation to a backup mode of operation in response to detecting a fault in the power grid. The second motion transmitting mechanism provides the one-way drive coupling such that in a first direction (a first polarity of torque) from the alternator to flywheel the second motion transmitting mechanism operates in an overrun mode in which the alternator input shaft can rotate at a speed faster than that of the flywheel whereas in a second direction (a second polarity of torque), opposite the first direction, from the flywheel to alternator the second motion transmitting mechanism is operates in a locked mode in which the flywheel can rotate up to the same speed as that of the alternator input shaft. When the third motion transmitting mechanism is in the disengaged condition the second motion transmitting mechanism permits the alternator input shaft to overrun the flywheel such that no driving motion is transmitted from the alternator input shaft to the flywheel whereas when the third motion transmitting mechanism is in the engaged condition drive torque can be transmitted in either direction between the flywheel and alternator input shaft so that the alternator input shaft and flywheel can rotate at the same speed.

In another exemplary embodiment of the present invention, a method of operating an uninterruptible power supply system is provided comprising the steps of operating the system in a standby mode by maintaining the system electrically connected to a power grid in a state of readiness to change to a backup mode in response to detecting a fault in the power grid, and operating the system in the backup mode by supplying electrical power to the power grid sufficient to overcome the power loss caused by the detected fault and to rotate a heat engine of the system up to a speed where the heat engine can be started and accelerated to full operation by introduction of a fuel energy source independent of the power grid.

DETAILED DESCRIPTION

Figure 1:
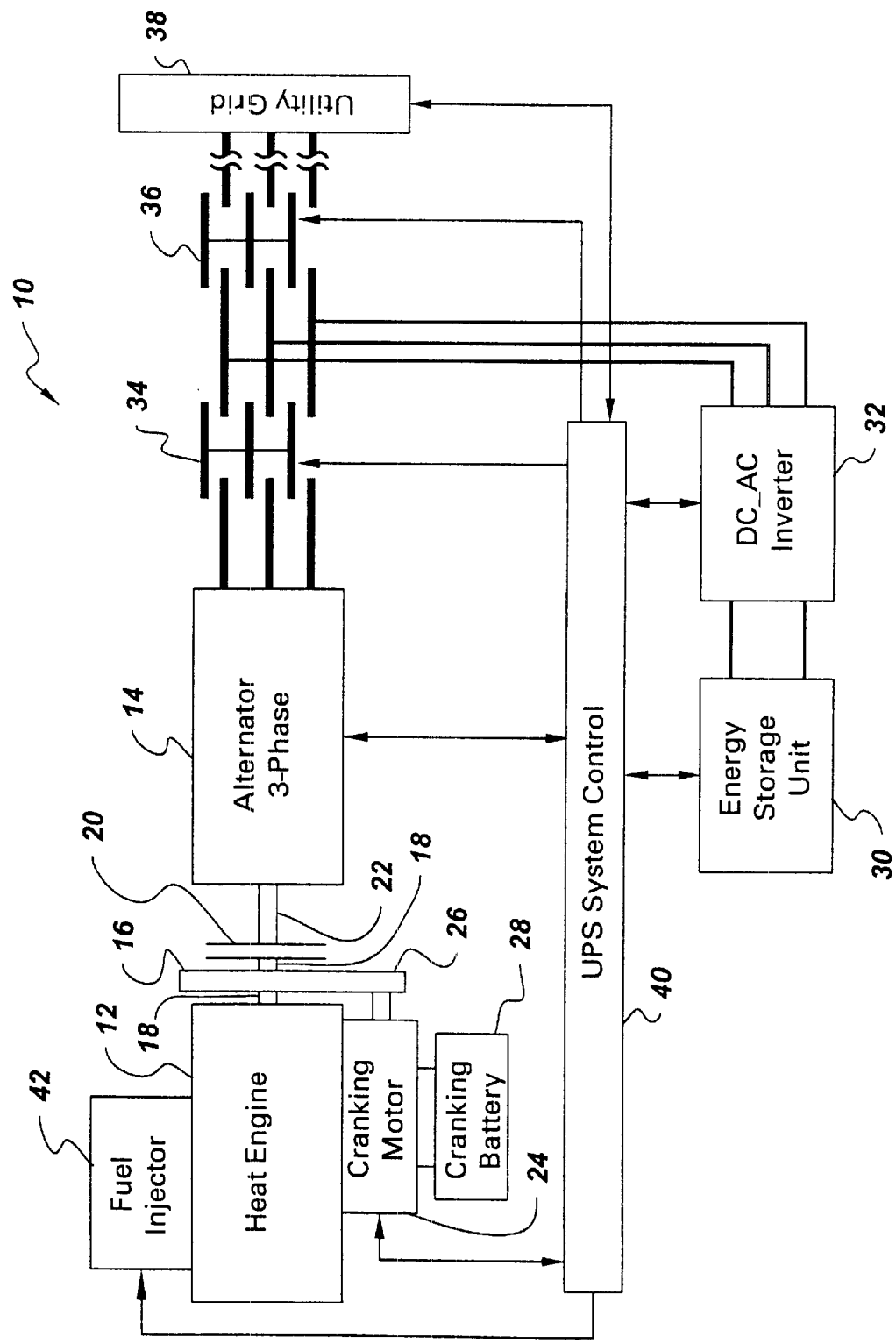
FIG. 1 is a block diagram of a prior art UPS system.

Referring now to the drawings and particularly to FIG. 1, there is illustrated a prior art uninterruptible power supply (UPS) system, generally designated 10. The prior art UPS system 10 of FIG. 1 includes a heat engine 12, an alternator 14, a flywheel 16 mounted on a crankshaft 18 of the heat engine 12, a motion transmitting mechanism 20 disposed between the flywheel 16 and an alternator input shaft 22 and actuatable for coupling the flywheel to and from the input shaft 22 of the alternator 14, a starter or cranking motor 24, gearing 26 drivingly coupling the cranking motor 24 to the flywheel 16 and a cranking battery 28 connected to the cranking motor 24. The cranking battery 28, for example, can be a 12V or 24V battery.

The prior art UPS system 10 also includes an energy storage unit 30, a DC-AC inverter 32 connected to the energy storage unit 30, and first and second transfer switches 34, 36, such as 3-phase contactors. The transfer switches 34, 36 are operable for connecting and disconnecting the alternator 14 and/or the DC-AC inverter 32 to and from a utility grid 38. The prior art UPS system 10 further includes a UPS system control 40 for detecting a fault in response to a given loss of power on the utility grid 38. In response to detection of the fault, the UPS system control 40 controls the operation of the first and second transfer switches 34, 36, the cranking motor 24 and a fuel injector 42 of the heat engine 12.

More particularly, in response to the detection of the fault, the UPS system control 40 immediately issues a command to the energy storage unit 30 to input DC electrical energy to the DC-AC inverter 32 and also closes the second transfer switch 36 which connects only the inverter 32, and not the alternator 14, to the utility grid 38. An alternate technique is for the inverter 32 to be connected to the energy storage unit 30, prior to the fault, i.e., maintaining the energy storage unit 30 at a full state of charge which thereby allows the second transfer switch 36 to be closed prior to the detection of the fault. The inverter 32 converts DC electrical energy from the energy storage unit 30 to AC electrical energy of the proper voltage, current and frequency to supply power to the utility grid 38 via the second transfer switch 36. The UPS system control 40 also issues a command to the cranking motor 24 to crank the flywheel 16 via gearing 26 and thus crank the crankshaft 18 of the heat engine 12. The electrical energy to rotate the flywheel 16 via the cranking motor 24 and gearing 26 is provided to the cranking motor 24 by the cranking battery 28. After the cranking motor 24 accelerates the heat engine 12 to a given speed, the UPS system control 40 enables the fuel injector 42 to start the heat engine 12. The fuel to the heat engine 12 is regulated to continue to accelerate the heat engine 12 and thus the alternator 14 to the speed that is required to generate the proper frequency for the critical load of the utility grid 38. For example, if a 4-pole synchronous alternator 14 is used, the synchronous speed is 1800 rpm. Alternators of alternate configuration also are in use. These include different numbers of poles, synchronous machines (wound field, permanent magnet, etc.), asynchronous or induction machines, and high speed alternators coupled to the heat engine 12 via a speed multiplier or reducer.

In the prior art UPS system 10, a time duration of at least fifteen seconds is disadvantageously required to start the heat engine driven alternator 14 and stabilize the electrical output of the alternator 14 prior to connecting the alternator 14 to the utility grid 38 via the first and second transfer switches 34, 36. During the initial fifteen seconds, the energy storage unit 30 supplies all of the electrical energy to the utility grid 38. After the output of the alternator 14 is stabilized and properly phased with the critical load of the utility grid 38, the first transfer switch 34 is closed and the heat engine driven alternator 14 supplies the critical load.

Figure 2:
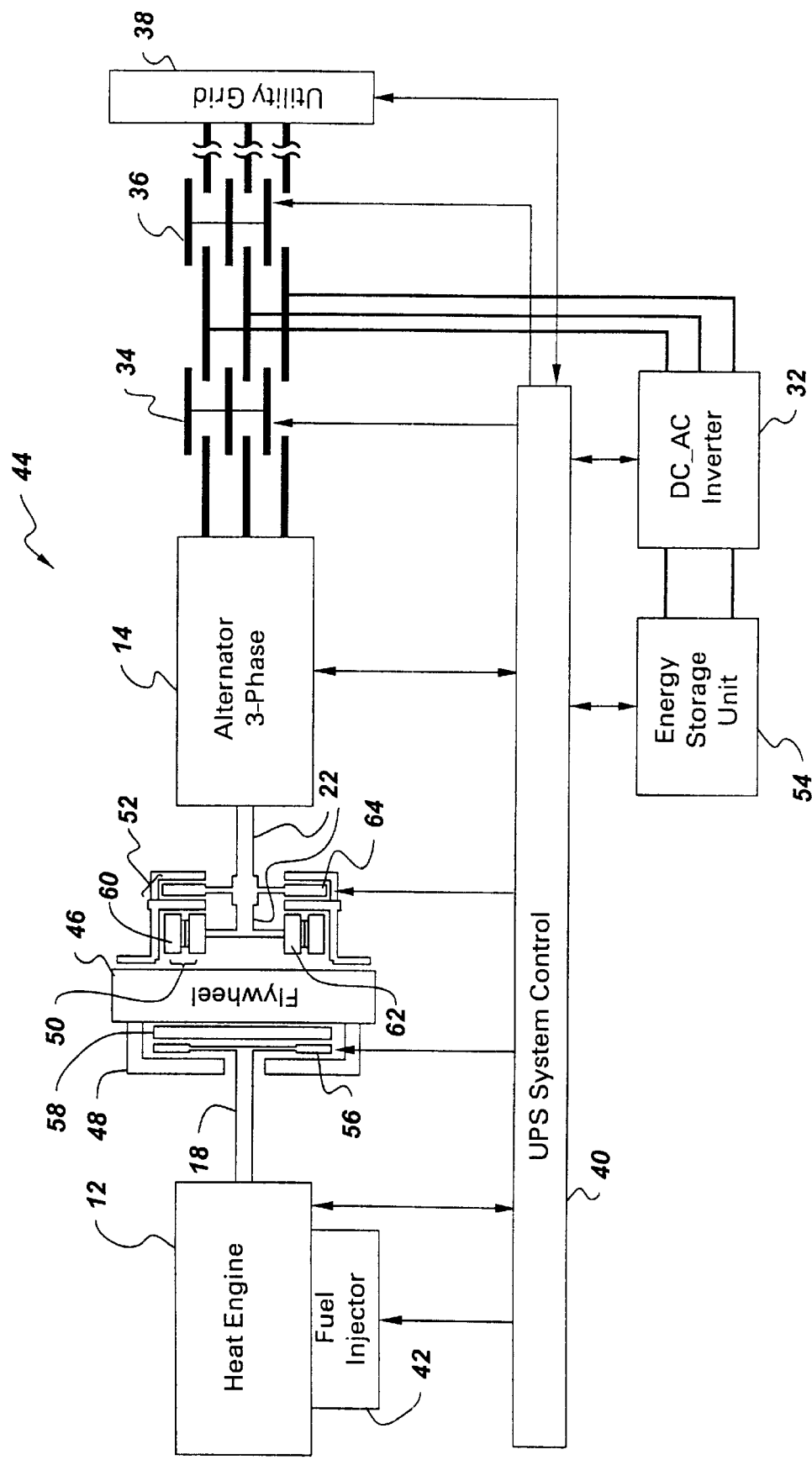
FIG. 2 is a block diagram of a low energy storage fast-start UPS system of the present invention.

Referring to FIG. 2, there is illustrated one embodiment of the low energy storage fast-start UPS system of the present invention, generally designated 44. Many components of the low energy storage fast-start UPS system 44 are generally similar to those of the prior art UPS system 10 which have been described above. These components, identified by the same reference numerals, are the heat engine 12, alternator 14, DC-AC inverter 32, first and second transfer switches 34, 36, UPS system control 40 and fuel injector 42. Unlike the prior art UPS system 10, the low energy storage fast-start UPS system 44 does not employ the cranking motor 24, gearing 26 and cranking battery 28 and does not have a flywheels 16 attached directly to the crankshaft 18 of the heat engine 12. Instead, the low energy storage fast-start UPS system 44 includes a relatively large inertial flywheel 46, first, second and third motion transmitting mechanisms 48, 50, 52 associated with the flywheel 46, and an energy storage unit 54 with similar peak power rating as the energy storage unit 30 of FIG. 1 but with a significant lower value of stored electrical energy.

In the illustrated embodiment, the first and third motion transmitting mechanisms 48, 52 are friction clutches 48, 52 while the second motion transmitting mechanism 50 is a one-way overrun clutch 50. The motion transmitting mechanisms 48, 50, 52 can be any other suitable devices which will perform functions that are substantially the same as those performed by the first, second and third clutches 48, 50, 52 which will now be described.

The first clutch 48 is actuatable between engaged and disengaged conditions for correspondingly drivingly coupling and decoupling the flywheel 46 to and from the crankshaft 18 of the heat engine 12. The first clutch 48 in the engaged condition is capable of transmitting drive torque in either direction between the flywheel 46 and heat engine 12. More particularly, the first clutch 48 is disposed between the flywheel 46 and the crankshaft 18 of the heat engine 12 and includes a low inertial, disk part 56 which is attached to the crankshaft 18 of the heat engine 12 and a pressure plate part 58 which is attached to the inertial flywheel 46. The flywheel 46 is coupled to and decoupled from the crankshaft 18 of the heat engine 12 when the disk part 56 and pressure plate part 58 of the first clutch 48 are respectively engaged with and disengaged from one another in the corresponding engaged and disengaged conditions of the first clutch 48. Engagement and disengagement of clutches 48 and 52 include conventional methods incorporating either mechanical springs and actuators or electrical clutching techniques.

The second clutch 50 provides a one-way drive coupling between the flywheel 46 and the input shaft 22 of the alternator 14. In the alternator-to-flywheel direction, the second clutch 50 is operable in an overrun mode in which the input shaft 22 of the alternator 14 is permitted to rotate faster than the flywheel 46 whereas when torque is applied to increase the speed of the flywheel 46, with respect to the alternator 14, the second clutch 50 is operable in a locked mode in which the flywheel 46 rotates at the same speed as that of the input shaft 22 of the alternator 14. The second clutch 50 can only transmit drive torque in the flywheel-to-alternator direction and when in the locked mode. More particularly, the second clutch 50 is disposed between the flywheel 46 and the input shaft 22 of the alternator 14 and includes an outer annular part 60 attached to the flywheel 46 and an inner annular part 62 attached to the alternator input shaft 22. The one-way drive coupling between the outer annular part 60 and inner annular part 62 of the second clutch 50 is provided such that the inner annular part 62 of the second clutch 50 rotating with the input shaft 22 of the alternator 14 can rotate faster than the outer annular part 62 of the second clutch 50 rotating with the flywheel 46 but the outer annular part 60 of the second clutch 50 cannot rotate faster than the inner annular part 62 of the second clutch 50.

The third clutch 52 is actuatable between engaged and disengaged conditions for correspondingly drivingly coupling and decoupling the flywheel 46 (via the outer annular part 60 of the second clutch 52) to and from the input shaft 22 of the alternator 14. The third clutch 52 in the engaged condition is capable of transmitting drive torque in either direction between the flywheel 46 and alternator 14. More particularly, the third clutch 52 is disposed between the flywheel 46 and the input shaft 22 of the alternator 14 and includes a disk part 64 attached to the alternator shaft 22. The outer annular part 60 of the second clutch 50 and a pressure plate part 66 are attached to the flywheel 46. When the third clutch 52 is in the disengaged condition, its disk part 64 and pressure plate part 66 are disengaged from one another and thus the second clutch 50 provides the only coupling between the flywheel 46 and the alternator input shaft 22 as described previously. When the third clutch 52 is in an engaged condition, its disk part 64 and pressure plate part 66 are engaged with one another and thus the third clutch 52 couples the flywheel 46 and input shaft 22 of the alternator 14 to one another such that drive torque can be transmitted in either. Thus, in its engaged condition, the third clutch 52, in effect, overrides the overrun mode of operation of second clutch 50 in which the second clutch 50 by itself cannot transmit drive torque from the input shaft 22 of the alternator 14 to the flywheel 46.

The low energy storage fast-start system 44 of the present invention is normally in a standby mode of operation in the absence of the detection of a power failure or fault and is changed to a backup mode of operation only by detection of a grid power failure or fault. During both standby and backup modes of operation, the first and second transfer switches 34, 36 are both closed. Thus, the output of the alternator 14 is electrically connected to the utility grid 38 and AC electrical energy from the utility grid 38 is applied to the alternator 14, causing rotation of the input shaft 22 thereof at the desired synchronous speed, that being 1800 rpm in the case of a 4-pole synchronous alternator and a 60 Hz utility grid. Likewise, the 60 Hz AC electrical power from the utility grid 38 is applied to the DC-AC (3-phase) inverter 32. During the standby mode, the inverter 32 and UPS system control 40 are operational to keep the energy storage unit 54 at a prescribed relatively high state of charge. The third clutch 52 is closed during the standby mode, overriding the overrun mode of the second clutch 50, such that the flywheel 46 is driven by the input shaft 22 of the alternator 14 to rotate at the synchronous speed of 1800 rpm also. Also in the standby mode, the first clutch 48 is in the disengaged condition and thus the heat engine 12 is stationary and thereby its crankshaft is not rotating as no torque is being transmitted by the first clutch 48 from the synchronously rotating flywheel 46 to the crankshaft 18 of the heat engine 12.

Figure 3:
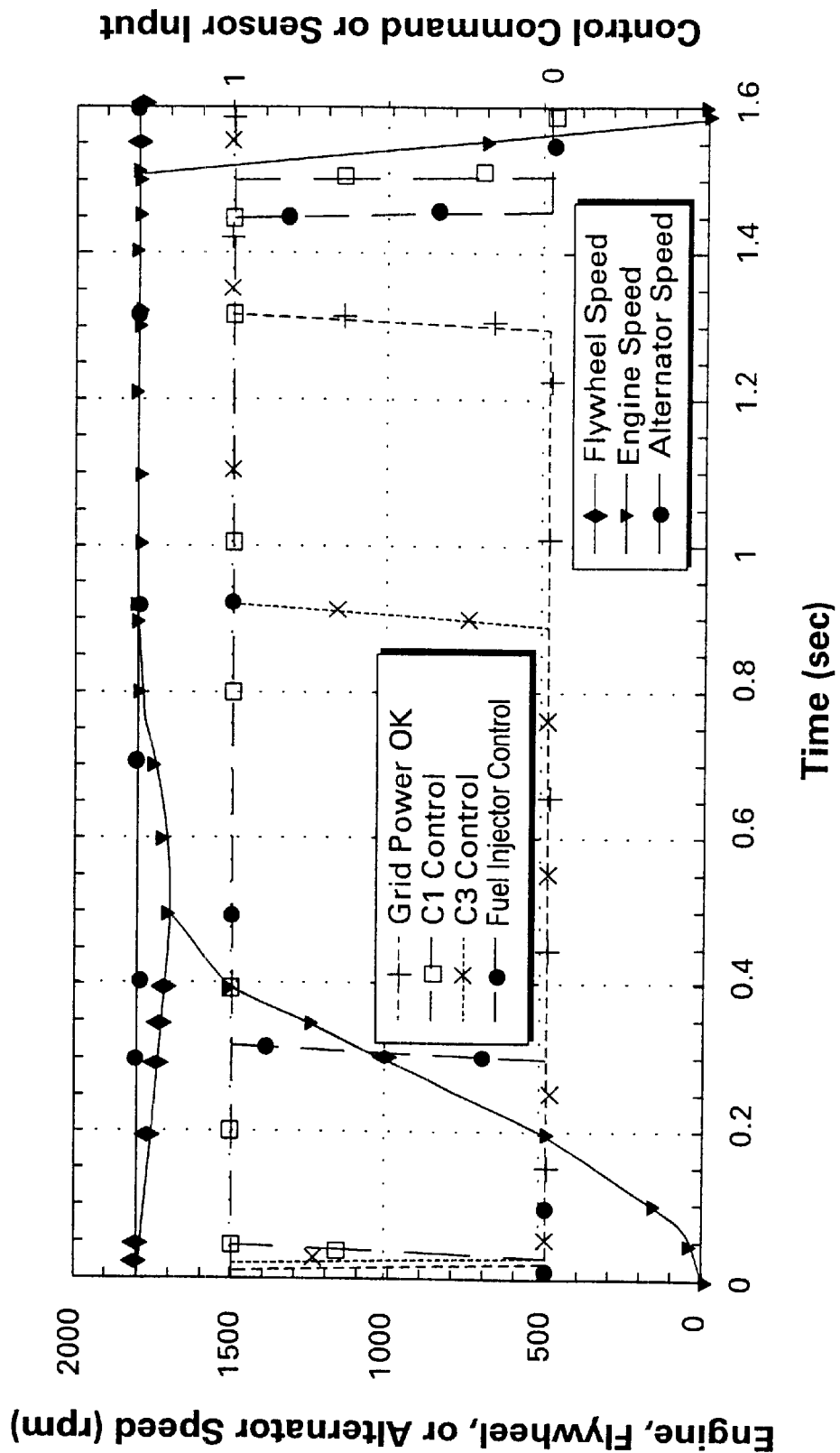
FIG. 3 is a graph of a timing sequence for the UPS system of the present invention.

Referring to FIG. 3, there is illustrated a graph of a timing sequence of the UPS system 44 for understanding the operation thereof. At the moment the UPS system control 40 detects a power fault on the utility grid 38, a "Grid Power OK" signal transitions from a logic level 1 to a logic level 0, changing the UPS system 44 from the standby mode to backup mode. Uninterrupted power flows to a critical load on the utility grid 38 from the DC-AC inverter 32 using the power provided by the energy storage unit 54. Within tens of milliseconds of the detection of the power fault, the third clutch (C3) 52 is actuated to a disengaged condition by a command signal (logic level 1 to logic level 0 transition) received from the UPS system control 40, followed by actuation of the first clutch (C1) 48 to an engaged condition by another command signal (logic level 0 to logic level 1 transition) received from the UPS system control 40. In its engaged condition, the first clutch (C1) 48 transmits drive torque from the relatively high inertia flywheel 46 to the low inertia crankshaft 18 of the heat engine 12 such that the rotational speed of the crankshaft 18 of the heat engine 12 accelerates rapidly as the rotational speed of the flywheel 46 decreases below the speed of the input shaft 22 of the alternator 14, causing the inner annular part 62 of the second clutch 50 to overrun the outer annular part 60 thereof because during the entire starting sequence of the heat engine 12 the alternator 14 continues to rotate at the synchronous speed which is faster than the now decreasing speed of the flywheel 46. As a prescribed starting speed (1000 rpm in this example) of the heat engine 12 is reached, the fuel injector 42 is enabled by a command signal (logic level 0 to logic level 1 transition) received from the UPS system control 40 and the heat engine 12 starts and continues to accelerate toward the synchronous speed. When the speed of the heat engine 12 reaches the synchronous speed of the alternator 14, the second clutch 50 assumes its locked mode in which the outer annular part 60 of the second clutch 50 locks up with the inner annular part 62 thereof such that the outer annular part 60 is transmitting drive torque to the inner annular part 62 and thus they rotate in unison with one another. After approximately 0.9 seconds, the third clutch (C3) 52 is actuated to the engaged condition by receipt of a command signal (logic level 0 to logic level 1 transition) from the UPS system control 40 and the heat engine 12 is thus also drivingly coupled by the third clutch (C3) 52 to the input shaft 22 of the alternator 14 and the heat engine driven alternator 14 thereby provides the critical power to the utility grid 38. After correction of the power fault is sensed (logic level 0 to logic level 1 transition of Grid Power OK) and the grid power has thus been restored, the UPS system 44 changes back to the standby mode in which the fuel injector 42 is disabled by a command signal (logic level 1 to logic level 0 transition) received from the UPS system control 40, followed by the UPS system control 40 sending a command signal (logic level 1 to logic level 0 transition) to the first clutch (C1) 48 to actuate it to the disengaged condition, causing the heat engine 12 to stop abruptly.

FIG. 3 also shows that the heat engine driven alternator 14 of the UPS system 44 provides the needed power output to the utility grid 38 in less than one second. When compared to the fifteen seconds in the case of the prior art UPS system 10, this is at least a factor of ten reduction in response time. Thus, for a one MW UPS system, the required energy storage is only approximately 417 W-h.

In summary, the low energy storage fast-start system 44 of the present invention is normally is in a standby mode of operation and is changed to a backup mode of operation only by detection of a grid power failure or fault. During both modes of operation of the system 44, the alternator 14 is constantly electrically connected to the grid 38 and rotating at the synchronous speed (1800 rpm, for example) so that the backup mode capability is in a constant state of readiness in the event of a grid failure. The inverter 32 and energy storage unit 54 remain electrically coupled to the utility grid 38 in the standby mode of operation of the system 44 so that the energy storage unit 54 maintains its charge and is ready to immediately supply the necessary power when the system 44 is changed to the backup mode of operation. The transfer switches 34, 36 between the utility grid 38 and the alternator 14 are closed during both standby and backup modes of operation and only are opened during testing of the system 44. In the standby mode of operation of the system 44, the first clutch 48 is in the disengaged condition and the flywheel 46 is thus decoupled from the heat engine 12. In the standby mode of operation of the system 44, the third clutch 52 is actuated to the engaged condition and the input shaft 22 of the alternator 14 thus rotatably drives the flywheel 46 via the third clutch 52. In the backup mode of operation of the system 44, the third clutch 52 is actuated to the disengaged condition and following disengagement of clutch 52, the first clutch 48 is actuated to the engaged condition coupling the flywheel 46 to the crankshaft 18 of the heat engine 12 which permits the second clutch 50 to allow the flywheel 46 to decrease in speed as the flywheel 46 transfers torque via the engaged first clutch 48 to the crankshaft 18 of the heat engine 12 to initiate and cause an increase of its speed of rotation up to the level where the heat engine 12 is started.

Other applications for the UPS system 44 can include those in emerging mission-critical power systems industry. Alternate environmentally friendly energy storage devices which can be used include high specific power ultracapacitors, high specific power flywheels, and high specific power batteries.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

What is claimed is:

1. An uninterruptible power supply system having a standby mode of operation and a backup mode of operation, said system comprising:
    a heat engine having a crankshaft;
    an alternator having an input shaft and an output electrically connected to an electrical power grid;
    a flywheel disposed between said crankshaft of said heat engine and said input shaft of said alternator;
    a first motion transmitting mechanism disposed between said flywheel and said crankshaft of said heat engine and actuatable between engaged and disengaged conditions for correspondingly drivingly coupling and decoupling said flywheel to and from said crankshaft of said heat engine;
    a second motion transmitting mechanism providing a one-way drive coupling between said flywheel and said input shaft of said alternator such that in a first direction from said alternator to said flywheel said second motion transmitting mechanism operates in an overrun mode in which said input shaft of said alternator can rotate at a speed faster than that of said flywheel whereas in a second direction, opposite said first direction, from said flywheel to said alternator said second motion transmitting mechanism operates in a locked mode in which said flywheel can rotate up to the same speed as that of said input shaft of the alternator so as to transmit drive torque from said flywheel to said alternator;
    a third motion transmitting mechanism disposed between said flywheel and said input shaft of said alternator and actuatable between engaged and disengaged conditions for correspondingly drivingly coupling and decoupling said flywheel to and from said input shaft of said alternator such that when said third motion transmitting mechanism is in said disengaged condition said second motion transmitting mechanism permits said input shaft of said alternator to overrun said flywheel such that no driving torque is transmitted from said input shaft of said alternator to said flywheel whereas when said third motion transmitting mechanism is in said engaged condition said input shaft of said alternator and said flywheel are drivingly coupled to one another such that said drive torque can be transmitted in either direction between said flywheel and input shaft of said alternator so that said input shaft of said alternator and said flywheel can rotate at the same speed;
    a source of AC electrical energy provided by an energy storage source and a DC-AC inverter connected to the electrical power grid; and
    an uninterruptible power supply system control connected to the electrical power grid and to said heat engine and said first and third motion transmitting mechanisms for controlling operation of said heat engine and said first and third motion transmitting mechanisms so as to change said system from a standby mode of operation to a backup mode of operation such that in said standby mode said source of AC electrical energy is charging, and ready to supply power to the power grid and said first and third motion transmitting mechanisms are respectively in disengaged and engaged conditions so as to transmit alternator rotary motion to said flywheel but not therefrom to said heat engine, whereas in said backup mode said source of AC electrical energy is supplying power to the power grid in response to said control detecting of a fault in the power grid and said first and third motion transmitting mechanisms are respectively in engaged and disengaged conditions so as to permit said alternator, via said second motion transmitting mechanism, to overrun said flywheel and allow transmitting of flywheel torque to accelerate said heat engine to a starting speed for driving said alternator to supply the power to the power grid.

2. The system of claim 1 in which in absence of said control detecting a fault in the power grid, said control is operable to maintain said system in said standby mode of operation such that said alternator rotates at said predetermined speed so as to be in a constant state of readiness for facilitating starting of said heat engine in response to said control changing said system from said standby mode to said backup mode.

3. The system of claim 1 in which in absence of said control detecting a fault in the power grid, said source of AC electrical energy remains coupled to the power grid to receive electrical energy therefrom sodas to be charged and ready to supply electrical energy to the power grid upon said control changing said system from said standby mode to said backup mode.

4. The system of claim 1 in which in absence of said control detecting a fault in the power grid, said control is operable to maintain said system in said standby mode of operation in which said first motion transmitting mechanism is maintained in said disengaged condition such that said flywheel is decoupled from said heat engine.

5. The system of claim 1 in which in absence of said control detecting a fault in the power grid, said control is operable to maintain said system in said standby mode of operation in which said third motion transmitting mechanism is maintained in said engaged condition such that said input shaft of said alternator rotatably drives said flywheel via said third motion transmitting mechanism.

6. The system of claim 1 in which in response to said control detecting a fault in the power grid, said control is operable to change said system from said standby mode of operation to said backup mode of operation in which said control actuates said third motion transmitting mechanism to said disengaged condition.

7. The system of claim 1 in which in response to said control detecting a fault in the power grid, said control is operable to change said system from said standby mode of operation to said backup mode of operation in which said first motion transmitting mechanism is actuated to said engaged condition driving coupling said flywheel to said crankshaft of said heat engine which permits said second motion transmitting mechanism to allow said flywheel to decrease in speed as said flywheel transfers torque to said crankshaft of said heat engine via said first motion transmitting mechanism to initiate and increase the speed of rotation of said heat engine to a predetermined speed where said heat engine is started by said control.

8. The system of claim 7 in which in response to said control detecting a fault in the power grid, said control is operable to change said system from said standby mode of operation to said backup mode of operation in which said control actuates said third motion transmitting mechanism to said engaged condition once said heat engine and said flywheel reach said speed of said input shaft of said alternator.

9. The system of claim 1 in which said first and third motion transmitting mechanisms are friction clutches.

10. The system of claim 1 in which said second motion transmitting mechanism is a one-way overrun clutch.

11. The system of claim 1 in which said first motion transmitting mechanism has a disk part which is attached to said crankshaft of said heat engine and a pressure plate part which is attached to said flywheel and is actuatable to drivingly couple and decoupled said flywheel to and from said crankshaft of said heat engine when said disk part and pressure plate part correspondingly are engaged with and disengaged from one another.

12. The system of claim 1 in which said second motion transmitting mechanism has an outer annular part attached to said flywheel and an inner annular part attached to said input shaft of said alternator, said one-way drive coupling being provided between said outer annular part and said inner annular part such that said inner annular part rotating with said input shaft of said alternator can rotate faster than said outer annular part rotating with said flywheel but said outer annular part cannot rotate faster than said inner annular part.

13. The system of claim 12 in which said third motion transmitting mechanism has a disk part attached to said input shaft of said alternator, an outer annular part of said second motion transmitting mechanism and a pressure plate part attached to said flywheel and actuatable to drivingly couple and decoupled said flywheel to and from said input shaft of said alternator when said disk part and pressure plate part correspondingly are engaged with and disengaged from one another.

14. The system of claim 1 wherein said source of AC electrical power includes:
 a DC electrical energy storage unit; and
 a DC-AC inverter connected between said energy storage unit and the electrical power grid for converting DC energy to AC energy and supplying the AC energy to the power grid.

* * * * *